United States Patent [19]

Marko et al.

[11] Patent Number: 5,193,513

[45] Date of Patent: Mar. 16, 1993

[54] MISFIRE DETECTION IN AN INTERNAL COMBUSTION ENGINE USING EXHAUST PRESSURE

[75] Inventors: Kenneth A. Marko, Ann Arbor; Bruce D. Bryant, Royal Oak, both of Mich.

[73] Assignee: Ford Motor Company, Dearborn, Mich.

[21] Appl. No.: 892,883

[22] Filed: Jun. 3, 1992

[51] Int. Cl.$^5$ .................... F02M 25/07; G01M 15/00
[52] U.S. Cl. .................... 123/571; 123/676; 123/481; 73/117.3; 364/424.03
[58] Field of Search ............... 123/479, 481, 419, 425, 123/436, 571, 616; 73/116, 117.3; 364/424.03, 431.08

[56] References Cited

U.S. PATENT DOCUMENTS

| | | | |
|---|---|---|---|
| 3,924,457 | 12/1975 | Oshima et al. | 73/116 |
| 3,965,677 | 6/1976 | Goto et al. | 60/277 |
| 3,983,754 | 10/1976 | Deguchi et al. | 73/346 |
| 4,040,294 | 8/1977 | Matsuda et al. | 73/117.3 |
| 4,083,234 | 4/1978 | Aono et al. | 73/116 |
| 4,302,814 | 11/1981 | Full et al. | 364/551.01 |
| 4,424,709 | 1/1984 | Meier, Jr. et al. | 73/117.3 |
| 4,566,423 | 1/1986 | Kenny et al. | 123/571 |
| 4,567,755 | 2/1986 | Ootsuka et al. | 73/117.3 |
| 4,602,507 | 7/1986 | Hayes | 73/117.3 |
| 4,971,010 | 11/1990 | Iwata | 123/435 |
| 5,041,976 | 8/1991 | Marko et al. | 364/424.03 |
| 5,060,279 | 10/1991 | Crawford et al. | 382/14 |

FOREIGN PATENT DOCUMENTS 0298654 12/1987 Japan .................... 123/676

OTHER PUBLICATIONS

"Non-contact Diagnosis of Internal Combustion Engine Faults Through Remote Sensing", Hadden, Hulls & Sutphin, Society of Automotive Engineers, 760146, Feb. 23-27, 1976.

Primary Examiner—Willis R. Wolfe
Attorney, Agent, or Firm—Mark Mollon; Roger L. May

[57] ABSTRACT

Misfiring of individual cylinders in an internal combustion engine is detected based on sensing exhaust pressure during each operating cycle of the engine. A pressure signal is sampled and digitized during each cycle to form an input vector for a pattern classifier. Predetermined internal coefficients of the trained classifier enable the classifier to discriminate between firing and misfiring cylinders in real time with a high degree of accuracy. Overall system cost is reduced by sharing a pressure transducer with an exhaust gas recirculation system on the internal combustion engine.

13 Claims, 3 Drawing Sheets

SENSOR SIGNAL

SAMPLE RATE

FRAME RATE

MISFIRE DETECTION IN AN INTERNAL COMBUSTION ENGINE USING EXHAUST PRESSURE

BACKGROUND OF THE INVENTION

The present invention relates in general to detecting misfires occurring during normal in-use vehicle operation of internal combustion engines and more specifically to identifying the occurrence of individual misfires by digitally processing a pressure wave from the exhaust manifold of the engine.

Catalytic converters are used in automobiles to reduce the amount of pollutants in the engine exhaust. When a cylinder misfires so that no combustion or incomplete combustion occurs, uncombusted fuel is introduced into the exhaust which then burns in the hot catalytic converter. The heat from fuel burning in the catalytic converter destroys the catalyst. Thus, it becomes desirable to detect and count engine misfires and signal the operator of the vehicle upon occurrence of excessive misfires so that steps may be taken to protect the catalytic converter.

Some prior art techniques for detecting misfires have employed monitoring of engine crankshaft accelerations, monitoring of electrical properties of the ignition spark, and monitoring various properties of the exhaust gas, such as, exhaust gas pressure and exhaust gas temperature. However, each prior art method has been found to have disadvantages which have prevented the attainment of an acceptable misfire detection system. Low signal-to-noise ratios and slow operating speed have required averaging of many events in some previous misfire detection systems. Such systems are only capable of detecting recurrent misfires of any particular cylinder rather than individual misfires. Other systems may require expensive custom sensors and components or may require disadvantageous sensor locations. Furthermore, existing misfire detection systems all suffer from poor accuracy which prevents any ability to identify very low misfire rates. For example, in order to protect catalytic converters and prevent excessive emissions of pollutants, a misfire rate of about one or two percent must be detected. In addition, the identity of the misfiring cylinder associated with each individual misfire must be determined and stored to facilitate later servicing of an engine to correct the condition leading to the misfires. Typically, such diagnostic strategies must have very low false alarm rates in order to be deployed in large numbers of vehicles.

SUMMARY OF THE INVENTION

The present invention is of the type using exhaust gas pressure to detect misfire, so that misfire can be detected over a wide range of speed and load conditions in the engine. The invention employs pressure transducer means in communication with the exhaust manifold of an engine for generating a pressure signal responsive to exhaust pressure within the exhaust manifold. Position means are employed for generating a plurality of position signals indicative of predetermined rotational positions within a cycle of the internal combustion engine. An analog-to-digital converter is coupled to the pressure transducer means and the position means for sampling the pressure signal at the predetermined rotational positions to generate digitized pressure data. A trained classifier has a data input coupled to the analog-to-digital converter and has a set of predetermined internal coefficients for processing the digitized pressure data to generate an output signal indicative of the detection of individual misfires. In a preferred embodiment, the pressure transducer means is shared with an exhaust gas recirculation system which uses the pressure signal in controlling the introduction of exhaust gas into the engine intake. Thus, the present invention achieves the advantages of high accuracy in a real-time system allowing low misfire rates to be detected. The invention further exhibits advantages of low cost and a low part count without requiring any expensive or customized components.

BRIEF DESCRIPTION OF THE DRAWINGS

The novel features of the invention are set forth with particularity in the appended claims. The invention itself, however, both as to its organization and method of operation together with further objects and advantages thereof, may best be understood by reference to the following description taken in conjunction with the accompanying drawings in which:

DETAILED DESCRIPTION OF PREFERRED EMBODIMENTS

In accordance with the present invention, a data classifier (i.e., a pattern recognition system), such as a neural network simulation program, is used in conjunction with a high speed data acquisition system to produce a misfire detection system that is trained to recognize data signatures of individually misfiring cylinders. During training of the classifier, an engine is operated in a service bay with intentionally introduced misfires (i.e., bugs), each such bugged operating trial being labeled according to the identity of the misfiring cylinder or cylinders. The misfires can be introduced by inhibiting the ignition spark for an individual firing or cutting off fuel to a cylinder for an individual firing, for example. Data from a normal (i.e., nonmisfiring) engine is also included in the training. The data from a sufficiently large number of trials is then presented to the data classifier as training vectors in a training operation. During training, a set of internal coefficients in the classifier is recursively readjusted until the classifier produces the correct label (classified output) for each training vector. Subsequently, a classifier with the same internal coefficients is attached to an in-use engine substantially identical with the test engine to monitor misfires in real time.

Figure 1:
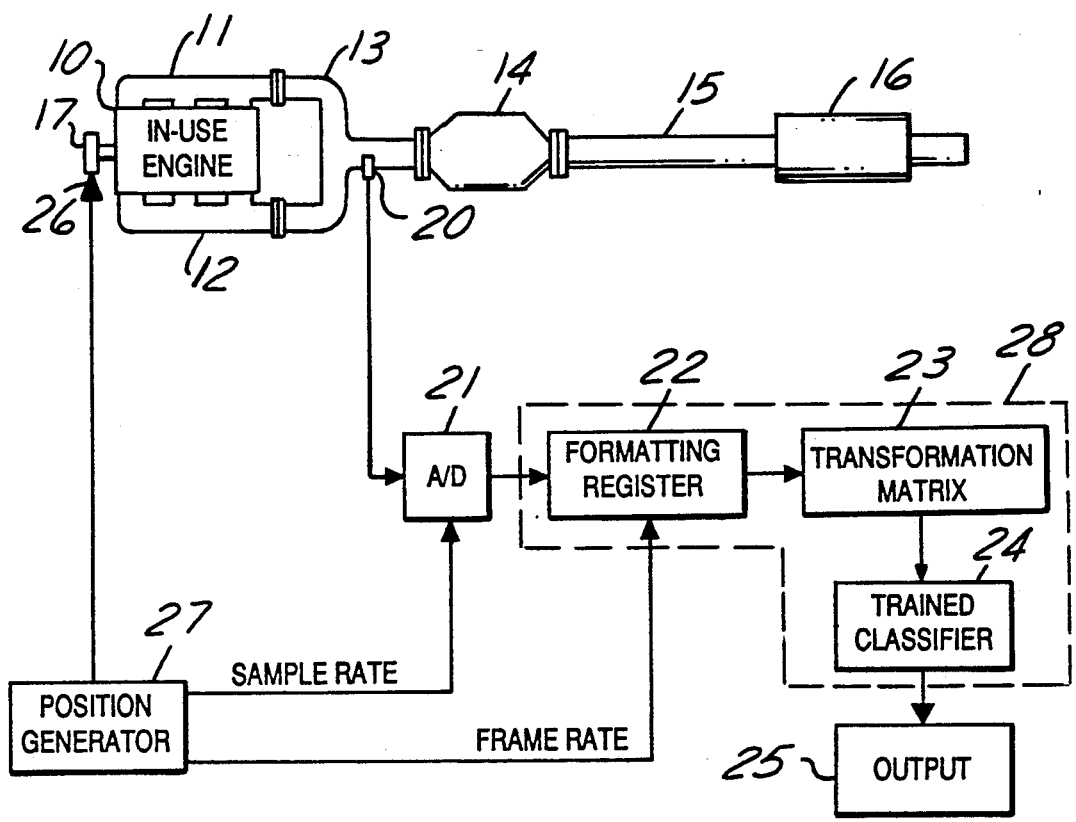
FIG. 1 illustrates an on-board misfire detection system according to the present invention.

A misfire detection system for monitoring engine misfires onboard a vehicle is shown in FIG. 1. An internal combustion engine 10 includes a right hand exhaust manifold 11 and a left hand exhaust manifold 12 joined to an exhaust conduit 13. Exhaust gases from engine 10 flow through manifolds 11 and 12 and conduit 13 to a catalytic converter 14, a conduit 15, and a muffler 16. Engine 10 drives an output shaft 17, such as a crankshaft or a camshaft.

The present invention collects exhaust pressure data at predetermined sample times within each cycle of engine operation. Thus, a pressure transducer 20 is in communication with the exhaust manifolds, as shown. An analog pressure signal from transducer 20 is coupled to the input of an analog-to-digital (A/D) converter 21 which provides digital samples to a formatting register 22. The resulting formatted digitized pressure data is coupled through a transformation matrix 23 which simplifies the data representation to a trained classifier 24 containing predetermined internal coefficients obtained in a separate training process. Trained classifier 24 provides an output 25 indicative of the misfire or nonmisfire classification of each engine cycle (i.e., identities of any misfiring cylinders during the engine cycle).

Predetermined rotational positions within a cycle of the engine 10 are determined using a position sensor 26 connected to position generator 27. Position sensor 26 may include a fixed variable reluctance (VR) sensor located in proximity to a multi-toothed rotating wheel connected to output shaft 17. Position generator 27 produces a reference signal once per engine cycle which defines a frame rate for formatting the digitized pressure data in formatting register 22. Position generator 27 also generates a plurality of position signals within each engine cycle at predetermined rotational positions, thus providing a sample rate to a A/D converter 21. In a preferred embodiment, the position signals indicate rotational positions separated by about ten degrees, resulting in about 72 samples in each frame relating to an engine cycle. Thus, formatting register 22 collects 72 samples from A/D converter 21 into a single frame which is provided to transformation matrix 23 for transformation into a simplified representation in order to reduce the amount of computation required in trained classifier 24. The simplified data representation from transformation matrix 23 includes a plurality of digital values which comprise an input vector which is processed in a pattern matching space (defined by the set of internal coefficients) within trained classifier 24 to produce a classification output 25. The meaning of output 25 depends on the manner in which the internal coefficients are derived during training of the classifier. In the preferred embodiment, trained classifier 24 includes internal coefficients which classify an input vector according to properly firing or misfiring cylinders.

Figure 2:
FIG. 2 shows a typical pressure sensor signal from the sensor in FIG. 1.

FIG. 2 illustrates a typical sensor signal from sensor 20 of FIG. 1 which characterizes the exhaust pressure (i.e., acoustic) waveform. The waveform contains sufficient information to allow detection of misfiring and nonmisfiring cylinders. However, prior art misfire detection systems based on exhaust pressure have used deterministic algorithms based on certain expert derived models in order to detect a misfire. The development of such a deterministic algorithm requires an intense expert study of the system to understand precisely the system operation. Such expert system development takes a large amount of time and resources and has only been able to define a rough approximation of system operation. Therefore, prior art systems have had limited accuracy.

Figure 3:
FIG. 3 shows the sample rate for operating the analog-to-digital converter of FIG. 1.
Figure 4:
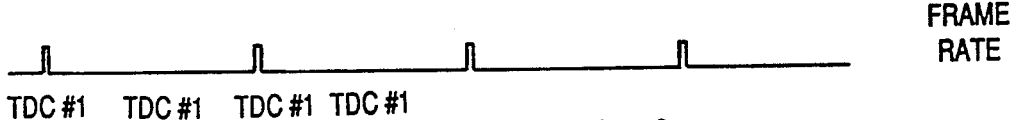
FIG. 4 illustrates the frame rate for formatting digital data obtained in FIG. 1.

The present invention bypasses the drawbacks of expert system development by acquiring digital pressure data and formatting it into input vectors for application to a trained classifier. FIG. 3 shows the sampling rate at which the sensor signal is sampled by an analog-to-digital converter, and FIG. 4 shows the frame rate for formatting the digital data according to a reference signal occurring once per engine cycle (i.e., after two rotations of a four-cycle engine). The position sensor may conveniently be located on the engine camshaft to facilitate identification of each engine cycle. Alternatively, a sensor for generating the sample rate may be located on the engine crankshaft and a separate cylinder identification sensor may be located on the camshaft or other means may be used to detect each engine cycle.

Trained classifier 24 in FIG. 1 preferably employs coefficients determined in advance using a test system, thereby eliminating any need for the capability of actual training within classifier 24. Formatting register 22, transformation matrix 23, and trained classifier 24 are preferably implemented using a microcomputer 28. The required computing power of microcomputer 28 is reduced by not including trainability for classifier 24.

Figure 5:
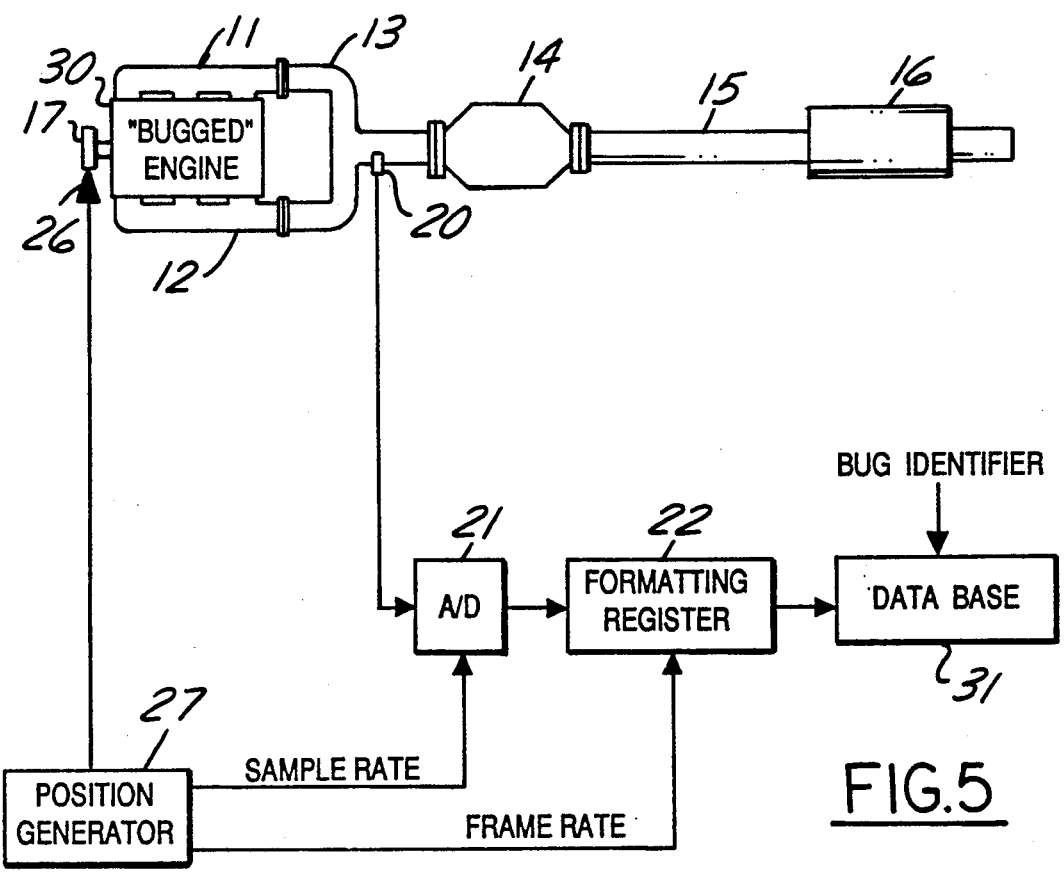
FIG. 5 illustrates a test system for collecting digitized pressure data with known misfires.
Figure 6:
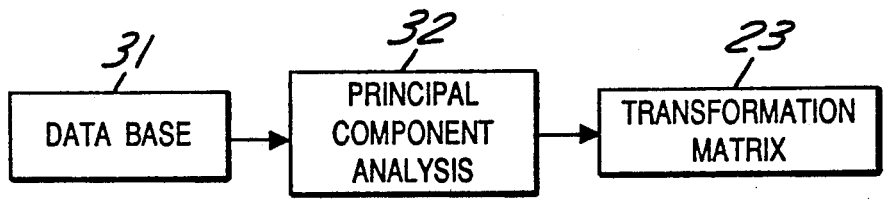
FIG. 6 illustrates a method for simplifying the representation of the digital pressure data.
Figure 7:
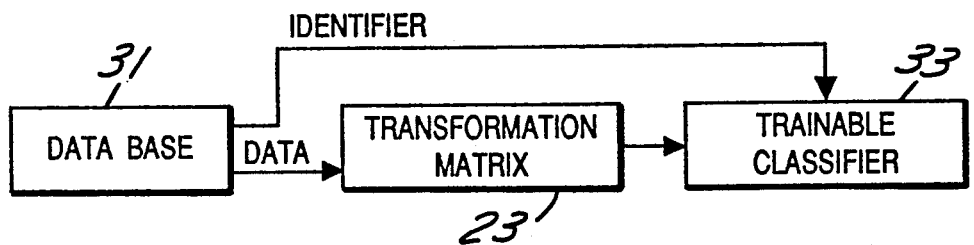
FIG. 7 illustrates a method for presenting simplified data to a trainable classifier to determine the internal coefficients used in the present invention.

The predetermined internal coefficients for the trained classifier are obtained as shown in FIGS. 5-7. A bugged engine 30, substantially identical to the engine and exhaust system to be utilized in production vehicles, is operated under a variety of conditions to collect training vectors which are compiled into a data base 31. Engine 30 is bugged by deliberately introducing misfires and combinations of misfires in an engine cycle. Data is generated using various engine malfunctions that could lead to misfire and under a variety of speed and load operating conditions. Each training vector compiled in data base 13 is labeled with a bug identifier to identify which, if any, cylinders were misfiring in the training vector.

After collection of sufficient vectors in data base 31 to adequately represent all possible normal firing and misfiring conditions over the full range of engine speed and load, a technique, such as principal component analysis, is employed to reduce or simplify the representation of data in data base 31. The training vectors in data base 31 are initially represented in an arbitrary coordinate system. Using principal component analysis, an alternative coordinate system is found that results in a more compact and simplified representation of the data. Once the coordinate system is found that results in the most compact data representation, a transformation matrix is determined that remaps data from the original arbitrary coordinate system to the new simplified coordinate system. Thus, as shown in FIG. 6, data base 31 is input to a principal component analysis 32 which yields transformation matrix 23.

After the transformation matrix is identified, a classifier is trained as shown in FIG. 7. Data base 31 provides data through transformation matrix 23 to a trainable classifier 33. The bug identifier labels from data base 31 are provided directly to trainable classifier 33 for identifying the proper response associated with each training vector. During training, the classifier recursively adjusts its internal coefficients until it has learned the proper association between training vectors and their identifiers. The final values for the internal coefficients after full training are employed as the predetermined internal coefficients for a misfire detector system as shown in FIG. 1.

Figure 8:
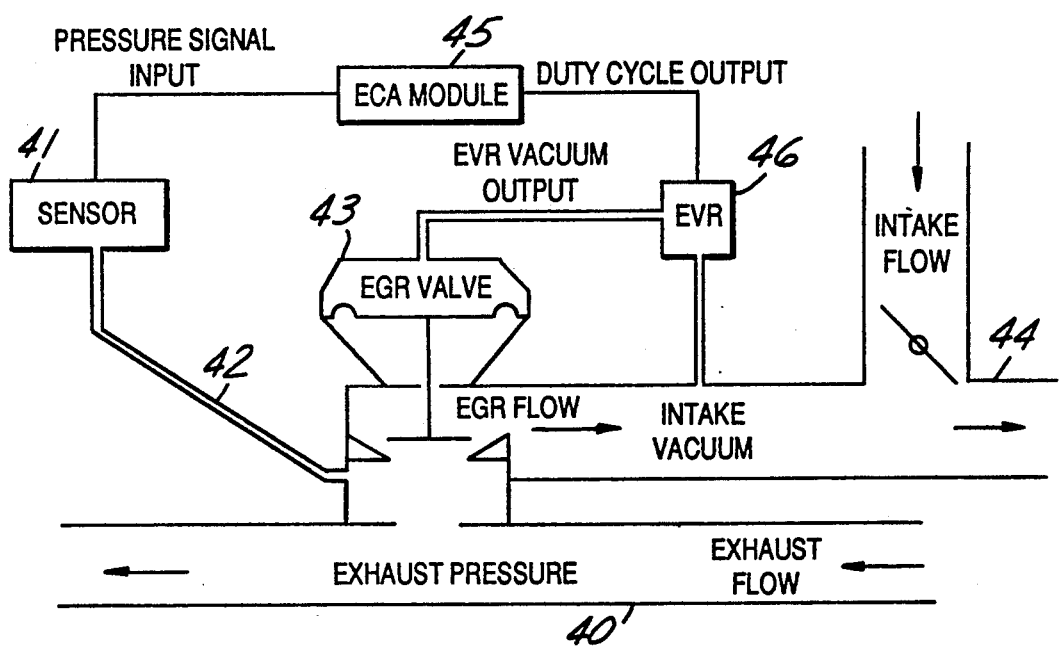
FIG. 8 illustrates a typical exhaust gas recirculation system.

In order to reduce the number of components, the present invention may share a pressure transducer with an exhaust gas recirculation (EGR) system. In the typical EGR system of FIG. 8, exhaust flow within an engine exhaust manifold 40 or other point in the exhaust system has an exhaust pressure that is monitored by a sensor 41 through a conduit 42. The EGR system reintroduces exhaust gas through an EGR valve 43 to an engine air intake manifold 44 in order to lower combustion temperatures and reduce the formation of oxides of nitrogen. An exhaust pressure signal from sensor 41 is provided to an engine control assembly (ECA) module 45 that produces a variable duty cycle output signal based on inputs of engine speed, engine vacuum, exhaust pressure, coolant temperature, and throttle angle in order to control the amount of exhaust gas reintroduced. The variable duty cycle signal is connected to an electronic vacuum regulator (EVR) 46 that utilizes intake vacuum to control the position of EGR valve 43 in accordance with the duty cycle signal.

Figure 9:
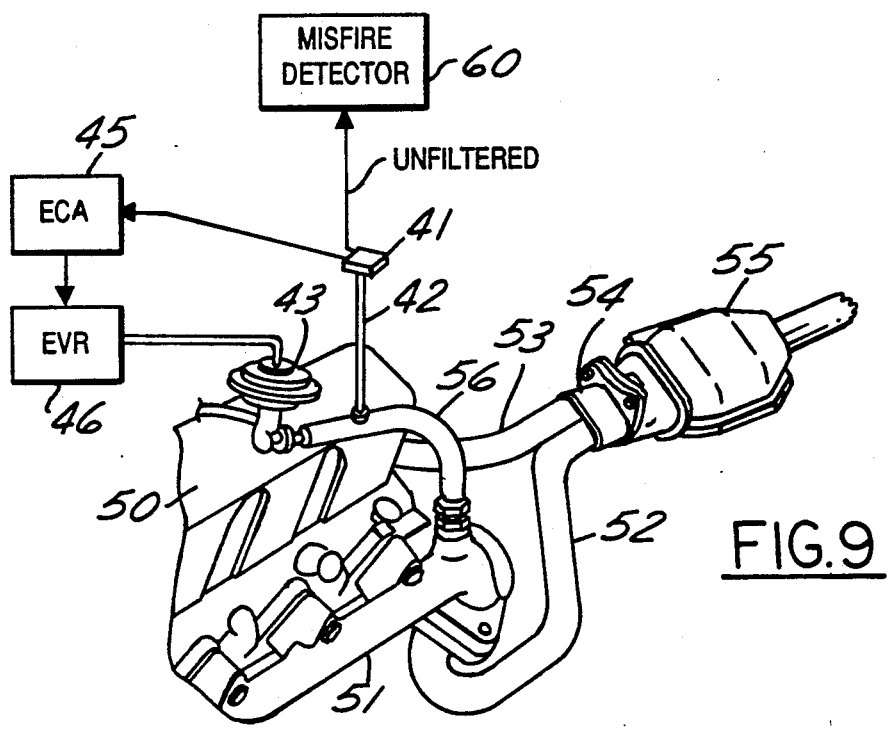
FIG. 9 illustrates a pressure transducer which is shared between a misfire detection system and an exhaust gas recirculation system.

As shown further in FIG. 9, an engine 50 has a left hand exhaust manifold 51 connected to an exhaust pipe 52. A right hand exhaust manifold (not shown) on the opposite side of engine 50 is connected to an exhaust pipe 53. The exhaust pipes are joined at coupling 54 which is further connected to a catalytic converter 55. Pressure sensor 41 communicates with left hand exhaust manifold through conduit 42 and a conduit 56. Pressure sensor 41 communicates with the right hand exhaust manifold through conduits 42 and 56 and exhaust pipes 52 and 53. In a typical EGR system, sensor 41 includes lowpass filtering of the pressure signal prior to sending the signal to ECA 45. For purposes of misfire detection according to the present invention, the pressure signal must not be filtered in the manner used in the EGR system. Thus, a separate unfiltered pressure signal is provided from sensor 41 to a misfire detector 60, in accordance with the invention.

An advantage of the classifier used in the invention is that the pressure transducer need not be located symmetrically with respect to separate left and right hand exhaust manifolds. The internal coefficients of the classifier adapt for any nonsymmetrical position. However, a symmetrical position, such as at coupler 54 in FIG. 9, could simplify the computation required in the classifier.

Figure 10:
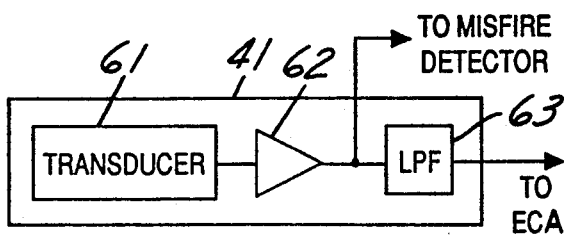
FIG. 10 shows the sensor of FIG. 9 in greater detail.

FIG. 10 shows sensor 41 in greater detail. A transducer element 61, such as a pair of capacitive plates or a resistive strain gauge, is connected to an amplifier 62. The output of amplifier 62 provides a direct output to misfire detector 60 and is coupled to a lowpass filter 63 for providing signal averaging prior to connection to ECA 45.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. Apparatus for detecting individual misfires in an internal combustion engine having an exhaust manifold, comprising:
   pressure transducer means in communication with said exhaust manifold for generating a pressure signal responsive to exhaust pressure within said exhaust manifold;
   position means for generating a plurality of position signals indicative of predetermined rotational positions within a cycle of said internal combustion engine;
   an analog-to-digital converter coupled to said pressure transducer means and said position means for generating digitized pressure data corresponding to said predetermined rotational positions; and
   a trained classifier having a data input coupled to said analog-to-digital converter and having a set of predetermined internal coefficients for processing said digitized pressure data to generate an output signal indicative of the detection of individual misfires.

2. The apparatus of claim 1 further comprising an exhaust gas recirculation system coupled to said pressure transducer means.

3. The apparatus of claim 1 further comprising register means coupled between said analog-to-digital converter and said trained classifier for formatting said digitized pressure data into respective input vectors for said trained classifier.

4. The apparatus of claim 3 wherein said register means is coupled to said position means, wherein said position means provides a reference signal for determining a full engine cycle, and wherein said input vectors each correspond to a respective engine cycle.

5. The apparatus of claim 3 further comprising translating means coupled to said trained classifier for translating said digitized pressure data to a more compact representation using a predetermined transformation function.

6. The apparatus of claim 5 wherein said transformation function is predetermined using principal component analysis.

7. The apparatus of claim 1 wherein said set of predetermined internal coefficients are determined in advance by training a trainable classifier on a substantially identical internal combustion engine using digitized pressure data containing known misfires.

8. A method for detecting individual misfires in an internal combustion engine having an exhaust manifold, comprising the steps of:
   generating a pressure signal responsive to exhaust pressure within said exhaust manifold;
   generating a plurality of position signals indicative of predetermined rotational positions within a cycle of said internal combustion engine;
   generating digitized pressure data; and
   processing said digitized pressure data using a set of predetermined internal coefficients to generate an output signal indicative of the detection of individual misfires.

9. The method of claim 8 further comprising the step of formatting said digitized pressure data into respective input vectors.

10. The method of claim 8 wherein said input vectors each correspond to a respective engine cycle.

11. The method of claim 8 further comprising the step of translating said digitized pressure data to a more compact representation using a predetermined transformation function.

12. The method of claim 11 wherein said transformation function is predetermined using principal component analysis.

13. The method of claim 8 wherein said set of predetermined internal coefficients are determined in advance by training a trainable classifier on a substantially identical internal combustion engine using digitized pressure data containing known misfires.

* * * * *